(12) United States Patent
Graubmann

(10) Patent No.: US 11,942,614 B2
(45) Date of Patent: Mar. 26, 2024

(54) THERMAL MANAGEMENT SYSTEM FOR AN ELECTRIC VEHICLE, AN ELECTRIC VEHICLE INCLUDING THE THERMAL MANAGEMENT SYSTEM, AND A METHOD FOR THERMAL MANAGEMENT OF THE ELECTRIC VEHICLE

(71) Applicant: Ymer Technology AB, Stockholm (SE)

(72) Inventor: Josef Graubmann, Greifenberg am Ammersee (DE)

(73) Assignee: YMER TECHNOLOGY AB, Stockholm (SE)

( * ) Notice: Subject to any disclaimer, the term of this patent is extended or adjusted under 35 U.S.C. 154(b) by 27 days.

(21) Appl. No.: 17/450,336

(22) Filed: Oct. 8, 2021

(65) Prior Publication Data
US 2022/0123384 A1    Apr. 21, 2022

(30) Foreign Application Priority Data

Oct. 15, 2020  (EP) .................................. 20202111

(51) Int. Cl.
*H01M 10/613* (2014.01)
*H01M 10/615* (2014.01)
(Continued)

(52) U.S. Cl.
CPC ....... *H01M 10/613* (2015.04); *H01M 10/615* (2015.04); *H01M 10/63* (2015.04); *H01M 10/6552* (2015.04); *H01M 2220/20* (2013.01)

(58) Field of Classification Search
CPC .. H01M 10/63; H01M 10/613; H01M 10/615; H01M 10/6552
See application file for complete search history.

(56) References Cited

U.S. PATENT DOCUMENTS

2014/0277869 A1*  9/2014  King ..................... B60W 10/00
                                                            701/22
2017/0088007 A1    3/2017  Melendez et al.

FOREIGN PATENT DOCUMENTS

DE    102009028328 A1    2/2011
WO     2012040022 A2    3/2012

OTHER PUBLICATIONS

Hu, Xiasong, et al.; "Battery warm-up methodologies at subzero temperatures for automotive applications: Recent advances and perspectives"; Progress in Energy and Combustion Science, vol. 77; Elsevier Ltd.; Mar. 2020; 28 Pages.
(Continued)

*Primary Examiner* — Karie O'Neill Apicella

(57) ABSTRACT

A thermal management system for an electric vehicle including an energy storage system and a vehicle component that requires cooling. A method for thermal management of an electric vehicle, and an electric vehicle including the thermal management system. The system including a heater arranged to heat the energy storage system, wherein the heater is arranged to be powered by either the energy storage system or an external power source, a control unit for controlling the heater and configured to identify when the heater is powered by the external power source, and to, when the heater is powered by the external power source receive data associated with the ambient temperature, determine whether the ambient temperature is below or above a minimum temperature, control the heater to heat the energy storage system when the ambient temperature is below the minimum temperature. The control unit is arranged to control the heater to heat the vehicle component when the heater is powered by the external power source and the ambient temperature is below the minimum temperature, and to direct excess heat from the vehicle component to the energy (Continued)

storage system when the heater is powered by the energy storage system.

13 Claims, 6 Drawing Sheets

(51) Int. Cl.
*H01M 10/63* (2014.01)
*H01M 10/6552* (2014.01)

(56) References Cited

OTHER PUBLICATIONS

Extended European Search Report; Application No. 20202111.9; Completed: Mar. 29, 2021; dated Apr. 8, 2021; 7 Pages.

* cited by examiner

THERMAL MANAGEMENT SYSTEM FOR AN ELECTRIC VEHICLE, AN ELECTRIC VEHICLE INCLUDING THE THERMAL MANAGEMENT SYSTEM, AND A METHOD FOR THERMAL MANAGEMENT OF THE ELECTRIC VEHICLE

TECHNICAL FIELD

The present invention relates to a thermal management system for an electric vehicle. The present invention also relates to an electric vehicle comprising the thermal management system. Further, the present invention relates to a method for thermal management of an electric vehicle.

BACKGROUND

Electric vehicles are becoming more and more popular. On the one hand side they are preferable for environmental reasons, by avoiding fossil fuels, and on the other hand side they are, most of the cases, preferred with regard to reduced total cost of ownership.

Cars are not the only type of vehicle that can be an electric vehicle. For example, boats, trucks, locomotives, airplanes and heavy-duty vehicles are also available as electrical vehicles.

Electric vehicles are usually powered by an energy storage system. The energy storage system here being defined as any kind of battery, battery pack or series of batteries for powering the electric vehicle.

For the usability of electric vehicles, it is important that the energy storage system has a long lifetime, i.e. a large number of charge/discharge cycles possible before the cells fail to operate satisfactorily. Keeping the energy storage system in an optimal temperature range is essential to maximize the lifetime.

Besides improving the energy storage system lifetime, keeping the energy storage system within the optimal temperature range during operation ensures that the energy storage system deliver as much power as possible. The article "Battery warm-up methodologies at subzero temperatures for automotive applications: Recent advances and perspectives" by Xiasong Hu et. al., published in volume 77 of "Progress in Energy and Combustion Science" in March 2020, states that for Lithium-ion batteries, the overall performance of traction batteries deteriorates significantly at low temperatures due to the reduced electrochemical reaction rate and accelerated health degradation, such as lithium plating. The article presents several battery warm-up methods.

In an electric vehicle, the power for heating and cooling comes from the energy storage system. Therefore, it is essential that the thermal management is as energy efficient as possible so that more of the power of the energy storage system can be used for operating the electric vehicle.

SUMMARY

It is an aim of the present disclosure to provide an improved thermal management system for an electric vehicle.

This aim is achieved by a device as defined in the claims.

The disclosure provides a thermal management system for an electric vehicle. The electric vehicle comprises an energy storage system and vehicle component that requires cooling, wherein there is a preferred temperature range within which the energy storage system is to be operated, and the range is between a minimum temperature and a maximum temperature. The thermal management system comprises a heater arranged to heat the energy storage system, wherein the heater is arranged to be powered by either the energy storage system or an external power source, and a control unit arranged to control the heater. The control unit is configured to identify when the heater is powered by the external power source. The control unit being arranged to, when the heater is powered by the external power source, receive data associated with the ambient temperature, determine if the ambient temperature is below or above the minimum temperature, and control the heater to heat, when the ambient temperature is below the minimum temperature, the vehicle component and the energy storage system. The control unit is arranged to direct excess heat from the vehicle component to the energy storage system when the heater is powered by the energy storage system.

The control unit is arranged to control the heater to heat the vehicle component when the heater is powered by the external power source and the ambient temperature is below the minimum temperature, and to direct excess heat from the vehicle component to the energy storage system when the heater is powered by the energy storage system. This is advantageous because with a preheated vehicle component, the heat from the vehicle component can be used to heat the energy storage system when the external power source is no longer plugged in. Thus, the energy needed from the energy storage for heating the energy storage system is reduced, and the energy in the energy storage system will last longer.

By preheating the energy storage system to a temperature which is higher than the minimum temperature, the energy storage system is also used as a thermal storage.

This thermal storage can be used when the vehicle is in use and the power for heating the energy storage system comes from the energy storage system itself. Thus, the energy needed from the energy storage for heating the energy storage system is further reduced, and the energy in the energy storage system will last longer.

The energy storage system as well as the vehicle component are used as thermal storages, which can be used when the vehicle is in use and the power for heating the energy storage system comes from the energy storage system itself. Thus, the present invention reduces the energy needed from the energy storage for heating itself. Accordingly, more of the power of the energy storage system can be used for operating the electric vehicle.

In one aspect, the control unit is arranged to control the heater to heat, when the ambient temperature is below the minimum temperature, the energy storage system up to a temperature which is higher than the minimum temperature and below or equal to the maximum temperature.

The vehicle component can be any component of the electric vehicle that requires cooling with a thermal fluid. For example, the vehicle component can be one or more parts of a power train, any kind of e-motor, inverter, or DC/DC converter.

The term "to direct excess heat from the vehicle component to the energy storage system" means that the heat energy from the preheating of the vehicle device is used for heating the energy storage system.

Suitable, the thermal fluid that has been used for cooling the preheated vehicle component is used for transferring the excess heat energy to the energy storage system. Thus, the transfer of the heat energy is done via the thermal fluid.

Commonly, the electric vehicle has a cooling loop including a thermal fluid for cooling the vehicle component during use of the vehicle. Suitable, the thermal fluid in the cooling loop for the vehicle component is heated by the heater when the vehicle is not in use and during charging of the energy storage system, and the thermal fluid is used for heating the vehicle component when the heater is powered by the energy storage system.

According to some aspects, the heater is configured to heat the thermal fluid in the cooling loop for the vehicle component when the heater is powered by the external power source and the ambient temperature is below the minimum temperature. Thus, the vehicle component is preheated by the thermal fluid in the cooling loop when the vehicle is not in use. When the vehicle is in use and during cooling of the vehicle component, the thermal fluid in the cooling loop absorbs the heat energy caused by the preheating of the vehicle device. The control unit is arranged to direct the thermal fluid from the cooling loop, which thermal fluid has absorbed the heat energy from the preheated the vehicle component, to heat the energy storage system when the heater is powered by the energy storage system. Thus, heat from the thermal fluid which has been used to cool the preheated vehicle component is used to heat the thermal storage. The thermal fluid in the cooling loop is directed to heat the energy storage system as long as there is excess heat in the thermal fluid in the cooling loop.

According to some aspects, the thermal management system comprises a heat exchanger arranged to heat the energy storage system, the heater is arranged to heat the heat exchanger when the energy storage system is colder than a minimum temperature, and the control unit is arranged to direct excess heat from the vehicle component to the heater when the heater is powered by the energy storage system. Preferably, the thermal fluid that has been used for cooling the preheated vehicle component is used for transferring the excess heat energy to the heater. Thus, the energy needed for powering the heater is reduced.

The control unit can also be configured to determine if there is excess heat in the thermal fluid in the cooling loop, and to direct the thermal fluid to the heater when there is excess heat in the thermal fluid and the energy storage system needs to be heated. With the term "to determine if there is excess heat in the thermal fluid" is meant to determine if the heat energy in the thermal fluid is enough to contribute to the heating of the energy storage system. For example, this can be done by determining if the thermal fluid is warm enough to contribute to the heating of the energy storage system. Alternatively, the available heat power can be calculated based on the temperature of the thermal fluid and the pump speed.

In cold ambient temperatures, the energy storage system may drop in temperature even when it is running. In such a case, it is beneficial to preheat the energy storage system to a temperature which is significantly higher than the minimum temperature because the energy storage system then does not need to use energy to heat itself before its temperature reaches below the minimum temperature. In hot ambient temperatures, it is beneficial to precool the energy storage system as much as possible using the external power source so that the energy storage system uses minimum power for cooling.

According to some aspects, the control unit receives the measured temperature from an external temperature sensor.

According to some aspects, thermal management system comprises a cooling unit arranged to cool the energy storage system. The cooling unit is arranged to be powered by either the energy storage system or an external power source, and the control unit is configured to control the cooling unit to cool the energy storage system to a predetermined temperature that is equal to or above the minimum temperature when the cooling unit is powered by the external power source and the ambient temperature is above the minimum temperature. With this thermal management system, the energy storage system of an electric vehicle is either preheated or precooled, depending on the ambient temperature when the electrical vehicle is connected to an external power source. The energy storage system of the electric vehicle can be preheated or precooled using the same power source that is charging the energy storage system. The energy storage system may comprise one or more batteries. Thus, the energy storage system can be preheated or precooled while the one or more batteries are connected to the grid. The energy storage system is thus not used for preheating or precooling the energy storage system and thus, energy in the energy storage system is saved.

According to some aspects, the control unit is arranged to receive data associated with a measured temperature in the cabin. The control unit is then arranged to heat, when the measured temperature in the cabin is below a selected cabin temperature, the cabin to the selected cabin temperature when the heater is powered by the external power source and to cool, when the measured temperature in the cabin is above the selected cabin temperature, the cabin to the selected cabin temperature when the cooling unit is powered by the external power source. In other words, the cabin can also be preheated or precooled when an external power source is connected. The selected cabin temperature is a desired temperature in the cabin which may be set by a user of the electric vehicle. The cabin has a separate cooling and heating unit which uses the heat from the heater to heat the cabin. This saves more power in the energy storage system since it only needs to keep a current temperature in the cabin during operation of the electric vehicle.

According to some aspects, the system comprises a first valve arranged in a fluid passage between the heater and the vehicle component, and the control unit is configured to control the amount of heat provided to the vehicle component by controlling the opening and closing of a first valve.

According to some aspects, to control the heater to heat the vehicle component comprises to control the amount of heat provided to a thermal fluid by the heater and to control the opening and closing of a first valve to provide the heat to the vehicle component via the thermal fluid. In other words, a thermal fluid is used for transporting the heat from the heater to the vehicle component and a first valve is used to control the flow of the thermal fluid to the vehicle component. This is an efficient way to provide heat to the vehicle component.

According to some aspects, wherein the control unit is arranged to, when the heater is powered by the energy storage system, direct excess heat from the vehicle component to the energy storage system. The vehicle component is thus used as thermal storage for heating the energy storage system when needed.

According to some aspects, the electric vehicle comprises a cooling loop including a thermal fluid for cooling the vehicle component, the thermal management system comprises a second valve disposed in the cooling loop, the second valve has an inlet arranged to receive the thermal fluid from the vehicle component, and an openable and closable outlet in fluid communication with the heater, and the control unit is arranged to direct excess heat from the vehicle component to the energy storage system by controlling the opening and closing of the second valve.

According to some aspects, the excess heat from the vehicle component is directed to the energy storage system via the heater. For example, the control unit is arranged to direct excess heat from the vehicle component to the heater by controlling the opening and closing of the second valve. The heat is thus directed from the heater to the energy storage system in the same way as when heating the energy storage system using only the heater. The heat is transported in thermal fluid in passages for the thermal fluid. The thermal fluid with the heat from the vehicle component can then be further heated at the heater if the energy storage system needs to be heated more than what can be achieved with the heat from the vehicle component.

According to some aspects, the control unit is arranged to, when the heater is powered by the energy storage system, direct excess heat from the vehicle component to a cabin of the electric vehicle. The thermal storage of the vehicle component can thus also be used to heat a cabin of the vehicle.

According to some aspects, the excess heat from the vehicle component is directed to the cabin via the heater. Thus, the excess heat from the vehicle component passes the heater before passing on to the energy storage system or the cabin or both.

According to some aspects, the control unit is arranged to control the heater to heat, when the ambient temperature is below the minimum temperature, the energy storage system up to a temperature which is at least 5° C. higher than the minimum temperature, and preferably up to a temperature which is at least 10° C. higher than the minimum temperature.

According to some aspects, the control unit is arranged to control the heater to heat, when the ambient temperature is below the minimum temperature, the energy storage system up to a temperature of at least 50% of the range between the minimum temperature and the maximum temperature, and preferably up to a temperature of at least 60% of the range between the minimum temperature and the maximum temperature.

Different temperatures to which the heater heats the energy storage system may be useful depending on the type of energy storage system, type of electric vehicle and the ambient temperature.

Preferably, the control unit is arranged to control the cooling unit to cool, when the ambient temperature is above the minimum temperature, the energy storage system to the minimum temperature or to a temperature close to the minimum temperature.

According to some aspects, the control unit is arranged to control the cooling unit to cool, when the ambient temperature is above the minimum temperature, the energy storage system to a predetermined temperature. The predetermined temperature is in a temperature range between the minimum temperature and a temperature which is 5° C. higher than the minimum temperature. Preferably, the predetermined temperature is in a temperature range between the minimum temperature and a temperature which is 3° C. higher than the minimum temperature, and most preferably the predetermined temperature is in a temperature range between the minimum temperature and a temperature which is 1° C. higher than the minimum temperature. The temperature range includes the minimum temperature. Preferably, the predetermined temperature is equal or close to the minimum temperature.

The present invention is particularly useful for thermal management of an electric vehicle of a non-road mobile machinery type, such as bulldozers, dump trucks and excavators, which is carrying out work within a small area, and is not used for long distance travels. Examples of non-road machinery are construction machinery excavators, loaders, bulldozers, agricultural and farming machinery such as harvesters and cultivators, railcars, locomotives, and inland waterway vessels. Vehicle of non-road mobile machinery type is often parked outdoors when it is not in use and can be exposed to extreme temperatures. Energy storage systems which are very cold take a lot of energy to heat to the working temperature above the minimum temperature. Therefore, it is especially useful to preheat these energy storage systems using the external power source. Corresponding advantages can be seen in non-road mobile machinery type vehicles that are used in warm environments. Energy storage systems left outside in warm temperatures require a lot of energy to cool, so pre-cooling those energy storage systems using the external power source is advantageous.

This aim is also achieved by a method for thermal management of an electric vehicle comprising an energy storage system and a vehicle component that requires cooling with a thermal fluid. There is a preferred temperature range within which the energy storage system is to be operated, and the range is between a minimum temperature and a maximum temperature, and the vehicle comprises a heater arranged to heat the energy storage system, wherein the heater is arranged to be powered by either the energy storage system or an external power source.

The method comprises identifying when the heater is powered by the external power source. The control unit being arranged to, when the heater is powered by the external power source:
  receive data associated with the ambient temperature,
  determine whether the ambient temperature is below or above the minimum temperature,
  preheating the energy storage system up to a temperature which is higher than the minimum temperature and below or equal to the maximum temperature when the measured temperature is below the minimum temperature, and
  preheating the vehicle component when the ambient temperature is below the minimum temperature, and
the method comprises directing excess heat from the vehicle component to the energy storage system when the heater is powered by the energy storage system.

Preferably, the energy storage system is preheated up to a temperature which is higher than the minimum temperature and below or equal to the maximum temperature when the measured temperature is below the minimum temperature.

According to some aspects, the vehicle comprises a cooling unit arranged to cool the energy storage system, wherein the cooling unit is arranged to be powered by either the energy storage system or an external power source, and the method comprises precooling the energy storage system to a predetermined temperature that is equal to or above the minimum temperature when the measured temperature is above the minimum temperature and the cooling unit is powered by the external power source.

According to some aspects, the energy storage system is preheated up to a temperature which is at least 5° C. higher than the minimum temperature.

According to some aspects, the energy storage system is preheated up to a temperature which is at least 10° C. higher than the minimum temperature.

According to some aspects, the energy storage system is preheated up to a temperature of at least 50% of the range between the minimum temperature and the maximum temperature.

According to some aspects, the energy storage system is preheated up to a temperature of at least 60% of the range between the minimum temperature and the maximum temperature.

According to some aspects, the energy storage system is preheated up to the maximum temperature.

According to some aspects, the energy storage system is precooled to a predetermined temperature in a temperature range between the minimum temperature and a temperature which is 5° C. higher than the minimum temperature.

According to some aspects, the energy storage system is precooled to a predetermined temperature in a temperature range between the minimum temperature and a temperature which is 3° C. higher than the minimum temperature.

According to some aspects, the energy storage system is precooled to predetermined temperature is in a temperature range between the minimum temperature and a temperature which is 1° C. higher than the minimum temperature.

This aim is also achieved by an electric vehicle as defined in claim 13. The electric vehicle comprising the thermal management system according to above. The vehicle is, for example, of a short-distance type, such as bulldozers, dump trucks and excavators, which are carrying out work within a small area and not intended for long distance travels. The vehicle can also be of a long-distance type, such as a car, a bus, or a truck.

BRIEF DESCRIPTION OF THE DRAWINGS

The invention will now be explained more closely by the description of different aspects and with reference to the appended figures.

DETAILED DESCRIPTION

Figure 1:
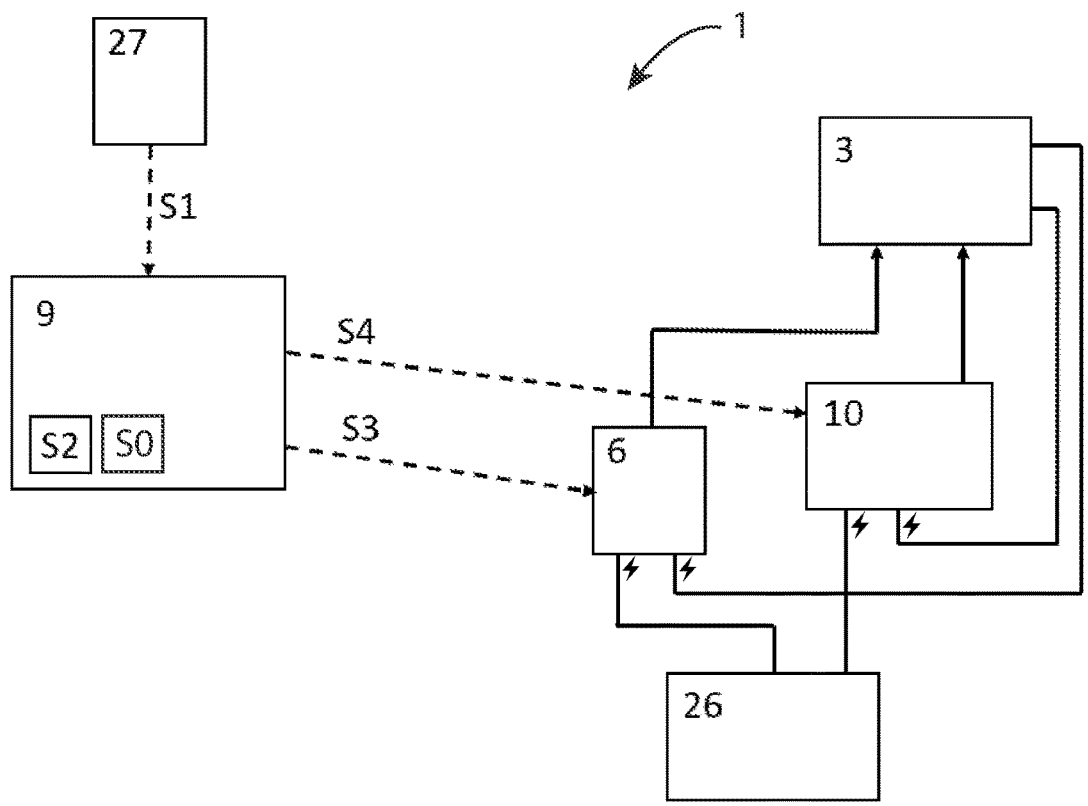
FIG. 1 shows a schematic diagram of an example thermal management system.

The present invention is not limited to the embodiments disclosed but may be varied and modified within the scope of the following claims. For example, temperature sensors may be added to many different places in the thermal management system. One example of where it may be advantageous to add temperature sensors is described below.

Aspects of the present disclosure will be described more fully hereinafter with reference to the accompanying drawings. The thermal management system disclosed herein can, however, be realized in many different forms and should not be construed as being limited to the aspects set forth herein. Like numbers in the drawings refer to like elements throughout.

The terminology used herein is for the purpose of describing particular aspects of the disclosure only and is not intended to limit the disclosure. As used herein, the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which this disclosure belongs.

As also stated in the background section, an energy storage system is herein being defined as any kind of battery pack or series of batteries for powering electric components of the electric vehicle. In other words, when the term energy storage system is used in this disclosure, a singular battery or a plurality of batteries are included in the term. An energy storage system for an electric vehicle usually comprises several batteries in series.

It should be noted that, in the figures, dashed lines illustrate signals sent or received, continuous lines represent where heat or cold is being transferred and continuous lines with a lightning symbol represent power lines, i.e. where power is being transferred between components in the figures.

In FIG. 1, a schematic diagram of an example thermal management system 1 is shown.

The thermal management system 1 is for controlling the temperature in an electric vehicle. The electric vehicle comprises an energy storage system 3.

Figure 2:
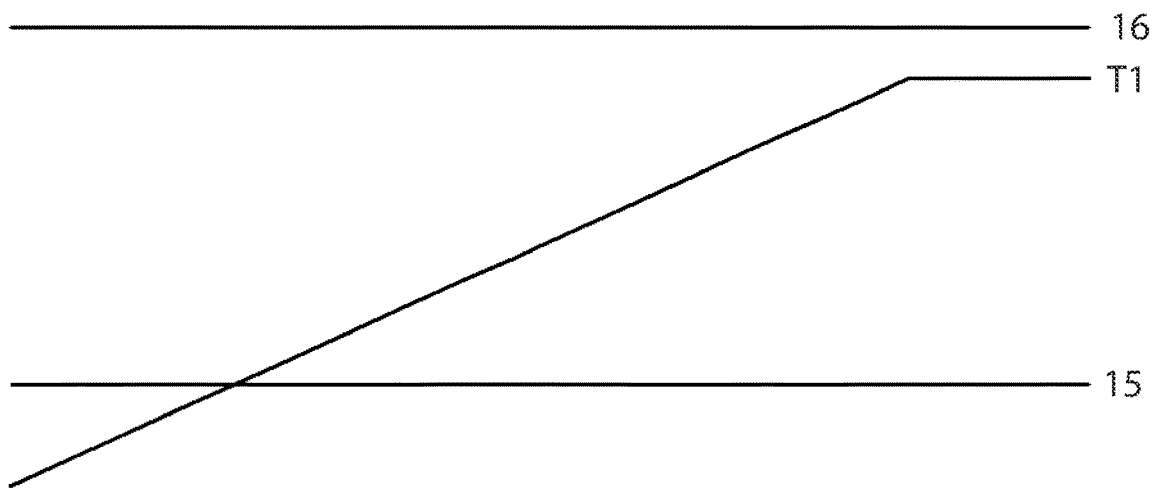
FIG. 2 shows an example on a minimum temperature and a maximum temperature and a curve with how much an energy storage system has been heated.

There is a preferred temperature range within which the energy storage system 3 is to be operated, and the range is between a minimum temperature 15 and a maximum temperature 16. The range is illustrated in FIG. 2. The minimum temperature 15 is thus the minimum temperature of the range and the maximum temperature 16 is the maximum temperature of the range. Different energy storage systems may have different ranges. For example, the minimum temperature 15 is 15° C. and the maximum temperature 16 is 35° C. The preferred temperature range is in general between 10° C. and 55° C. but other temperature ranges are also possible.

The thermal management system 1 comprises a heater 6, arranged to heat the energy storage system 3. The heater 6 is, for example, a high voltage heater, a Low-Voltage resistor heater, a PTC-type heater, or an AC-powered heater. It could be also the condensing part of a heat-pump system. The heater 6 may be any heater for heating thermal fluids suitable to be arranged in an electric vehicle.

The heater 6 is arranged to be powered by either the energy storage system 3 or an external power source 26. In other words, when an external power source 26 is connected to the electric vehicle, the heater 6, when used, is powered by the external power source 26, instead of the energy storage system 3 to preserve power in the energy storage system 3. The external power source 26 is for example connected to the electric vehicle by cable or by wireless power transmission. When the external power source 26 is disconnected, the heater 6, when used, is powered by the energy storage system 3.

The thermal management system 1 comprises a cooling unit 10 arranged to cool the energy storage system 3. The cooling unit 10 is for example a compressor which, together with a thermal expansion valve arranged in association with an evaporator or a heat exchanger, forms a refrigeration machine. In such a case, thermal vapor is used for cooling. The cooling unit may also be a heat-pump system. The cooling unit 10 is also arranged to be powered either by the energy storage system 3 or the external power source 26 as described above. In other words, when an external power source 26 is connected to the electric vehicle, the cooling unit 10, when used, is powered by the external power source 26, instead of powered by the energy storage system 3, to preserve power in the energy storage system 3. When the external power source 26 is disconnected, the cooling unit 10, when used, is powered by the energy storage system 3.

The thermal management system 1 comprises a control unit 9 arranged to control the heater 6 and the cooling unit 10. To control the heater 6 and the cooling unit 10 comprises to control how much the heater 6 should heat and how much the cooling unit 10 should cool. The present invention focuses on how the control unit controls the heater and the cooling unit when the electrical vehicle is connected to the external power source, and the heater and cooling unit are powered by the external power source. Thus, how the control unit controls the heater and the cooling unit when the electrical vehicle is disconnected from the external power source, and the heater and cooling unit are powered by the energy storage system of the vehicle, are not described herein.

The control unit 9 is configured to identify S0 when the heater 6 and the cooling unit 10 are powered by the external power source 26. For example, the control unit 9 is configured to detect when the electrical vehicle is connected to an external power source. For example, the control unit 9 receives information from the vehicle when the vehicle is connected to the external power source 26 and when the vehicle is disconnected from the external power source 26. To identify S0 when the heater 6 and the cooling unit 10 are powered by the external power source 26 may thus comprise to detect, via for example a sensor, that an external power source is connected, or to receive a signal from the electrical vehicle that an external power source is connected.

The control unit 9 is arranged to receive data associated with the ambient temperature. The ambient temperature being the present temperature outside of the vehicle or, alternatively, outside of a storage of the electric vehicle, e.g. outside of a garage. The data associated with the ambient temperature is for example a temperature measured with a temperature sensor or a temperature calculated from other factors, such as weather models or acquired by analysis of other data. For example, the control unit 9 is arranged to receive S1 the ambient temperature from an external temperature sensor 27. Alternatively, the control unit 9 is arranged to receive a measured temperature of the ambient temperature, in the case where the ambient temperature is measured with a temperature sensor.

The control unit 9 may also be arranged to receive a measured temperature of the temperature in the energy storage system and/or in the cabin. This is, for example, received in the control unit 9 from the electric vehicle. For example, the control unit 9 is arranged to receive the measured temperature from a temperature sensor measuring the temperature in the energy storage system and/or a temperature sensor measuring the temperature in the cabin. The control unit 9 may then be arranged to control the heater 6 and the cooling unit 10 based on the current temperature in the energy storage system and the ambient temperature. The control unit 9 may also receive a signal from the electric vehicle indicative of whether the energy storage system and/or the cabin needs to be heated or cooled, without a specific temperature measurement.

The control unit 9 comprises processing circuitry for processing data, and either comprises communication circuitry or is connected to communication circuitry for receiving data and sending instructions to the components it is controlling. Communication between the control unit 9 and any components may comprise wired or wireless communication. The control unit 9 thus either comprises communication means or is connected to an external communication means for receiving a signal from the external temperature sensor 27. The communication means may be just an input port for connecting the external temperature sensor 27 with a wire. The communication means may also be wireless communication means for receiving the measured temperature wirelessly.

The control unit 9 may comprise a data storage storing the minimum temperature 15 and the maximum temperature 16. The control unit 9 is arranged, when the heater 6 and the cooling unit 10 is powered by the external power source 26, to determine S2 whether the measured temperature is below or above the minimum temperature 15. This is, for example, done by comparing the measured temperature with a table comprising the minimum temperature 15 and the maximum temperature 16. The minimum temperature 15 and maximum temperature 16 of the energy storage system may also be changing values, i.e. not constant values, provided by the energy storage system or stored in the control unit. Variable minimum and maximum temperatures are, for example, based on state of charge of the energy storage system or degree of usage.

The control unit 9 is arranged to, when the heater 6 and the cooling unit 10 are powered by the external power source 26 and the measured ambient temperature is below the minimum temperature 15, control S3 the heater 6 to heat the energy storage system 3 up to a temperature which is higher than the minimum temperature 15 and below or equal to the maximum temperature 16. How much the energy storage system 3 is heated may depend on the type of energy storage system 3 used. It may also depend on how cold it is outside. If it is very cold and expected that the energy storage system 3 temperature drops even when it is in use, it may be heated up to the maximum temperature 16. The heater 6 is, for example, arranged to heat the energy storage system 3 up to a temperature which is at least 5° C. higher than the minimum temperature 15. The heater 6 is, for example, arranged to heat the energy storage system 3 up to a temperature which is at least 10° C. higher than the minimum temperature 15. The heater 6 is, for example, arranged to heat the energy storage system 3 up to a temperature of at least 50% of the range between the minimum temperature 15 and the maximum temperature 16. The heater 6 is, for example, arranged to heat the energy storage system 3 up to a temperature of at least 60% of the range between the minimum temperature 15 and the maximum temperature 16. Different temperatures to which the heater 6 heats the energy storage system 3 may be useful depending on the type of energy storage system 3 being used, the type of electric vehicle and the ambient temperature.

Further, the control unit 9 is arranged to, when the heater 6 and the cooling unit 10 are powered by the external power source 26 and the measured ambient temperature is above the minimum temperature 15, to control S4 the cooling unit 10 to cool the energy storage system 3 to a predetermined temperature equal to or above the minimum temperature 15 and below the maximum temperature 16. Preferably, the predetermined temperature is equal to the minimum temperature. However, the predetermined temperature can be slightly above the minimum temperature 15. For example, the predetermined temperature is in a temperature range between the minimum temperature 15 and a temperature which is 5° C. higher than the minimum temperature, or a temperature which is 3° C. higher than the minimum temperature, or a temperature which is 1° C. higher than the minimum temperature.

With this system, the energy storage system 3 of an electric vehicle is either preheated or precooled, depending on the ambient temperature when the vehicle is not in use. Additionally, it is preheated or precooled using an external power source. Thus, the energy storage system 3 is not used for powering the preheating and precooling, and accordingly, energy in the energy storage system 3 is saved. By preheating the energy storage system 3 to a temperature which is higher than the minimum temperature 15, the energy storage system 3 is also used as a thermal storage. In cold ambient temperatures, the energy storage system 3 may drop in temperature even when it is running, or at least not increase in temperature. In such a case, it is beneficial to preheat the energy storage system 3 to a temperature which is higher than the minimum temperature 15, because the energy storage system 3 then does not need to use energy to heat itself before its temperature reaches below the minimum temperature 15. In hot ambient temperatures, it is beneficial to precool the energy storage system 3 as much as possible using the external power source 26 so that the energy storage system 3 uses minimum power for cooling.

When the temperature in the energy storage system has reached the desired temperature during the preheating or precooling, the control unit may regulate the heater 6 and/or the cooling unit 10 so that the temperature in the energy storage system is kept close to the desired temperature, as long as the vehicle is powered by the external power source 26.

FIG. 2 shows an example of a minimum temperature 15 and a maximum temperature 16 and an example of a curve illustrating preheating of the energy storage system 3. The curve is just an example to show that the energy storage system 3 is preheated to a temperature T1 above the minimum temperature 15. In the illustrated example, the energy storage system 3 is preheated to a temperature close to the maximum temperature 16. Alternatively, the energy storage system 3 can be preheated to the maximum temperature 16. When the electric vehicle is unplugged from the external power source 26, the energy storage system 3 is already at an optimal working temperature and as can be seen in FIG. 2, there is also room for the energy storage system 3 to cool down before reaching the minimum temperature 15. The illustrated preheating curve may be beneficial in cold ambient temperatures, where the energy storage system 3 is predicted to cool down before use or even during use of the energy storage system 3.

Figure 3:
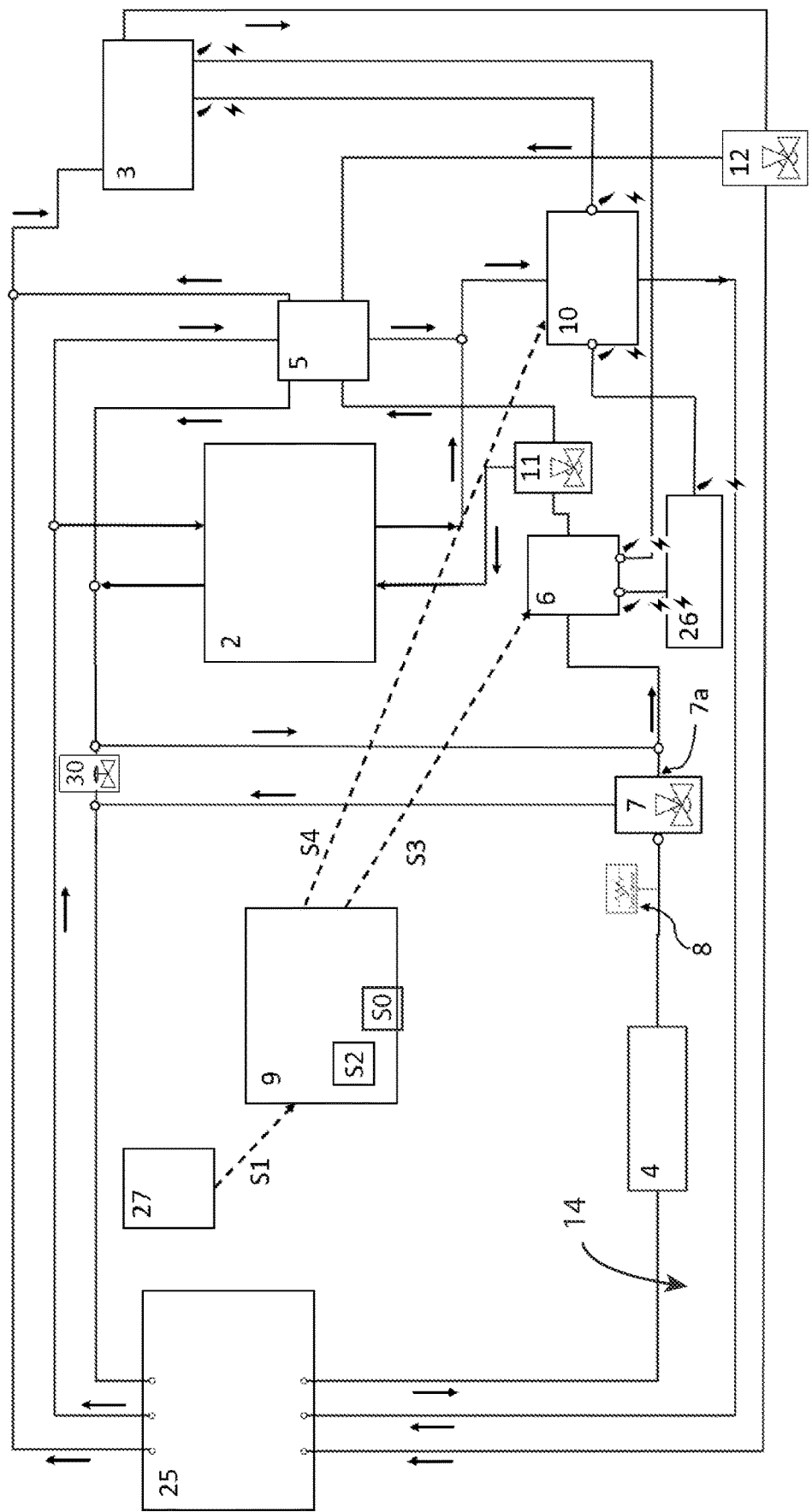
FIG. 3 shows a schematic diagram of an example thermal management system in a larger system in an electric vehicle.

FIG. 3 shows a schematic diagram of an example thermal management system 1 arranged in an electric vehicle. The electric vehicle comprises a cabin 2, an energy storage system 3, a vehicle component 4, and a passive cooling system 25, a cooling unit 10, and a first cooling loop 14 including a first thermal fluid for cooling the vehicle component 4. The vehicle also comprises a second cooling loop including a second thermal fluid for cooling the cabin 2, and a third cooling loop including a third thermal fluid for cooling the energy storage system 3. The three cooling loops pass through the passive cooling system 25 for cooling the thermal fluid in the cooling loops. The first and third thermal fluids may comprise water and glycol, or oil. The second thermal fluid may comprise a refrigerant gas. The flow direction of the thermal fluids in the cooling loops are illustrated with arrows. The thermal fluids are transported in passages in the cooling loops. The passages being, for example, piping.

In the illustrated example, heat and cold are transported with the thermal fluids passing the passive cooling system 25. The cooling loop 14 is used to cool the vehicle component 4 of the electric vehicle. The vehicle component 4 can be any component of the electric vehicle that requires cooling, for example, with a thermal fluid. For example, the vehicle component 4 can be any kind of drive train, e-motor, inverter, or DC/DC converter.

In this example, the thermal management system comprises one heat exchanger 5 arranged to heat the energy storage system 3, one heater 6 arranged to heat the heat exchanger 5 when the energy storage system 3 is colder than a minimum temperature. The heater 6 can also be also arranged to heat the cabin 2. The heater 6 is, for example, arranged to heat the cabin 2 when the cabin temperature is colder than a user selected temperature. It should be noted that in this example, the same heater 6 is used to heat both the cabin 2 and the energy storage system 3. The heater 6 is powered by the energy storage system 3, but it may also be powered by an external power source when the electric vehicle is connected to such, for example, when it is charging.

The thermal management system may comprise a first valve 13, as shown in FIGS. 5-11, for transferring heat from the heater 6 to the vehicle component 4 when the heater 6 is powered by the external power source 26, and the ambient temperature is below the minimum temperature 17. For example, the heat is transferred to the vehicle component 4 via the thermal fluid in the cooling loop 14. Alternatively, the heat is transferred to the vehicle component 4 via a thermal fluid in a separate piping.

The thermal management system comprises a second valve 7 disposed in the first cooling loop 14 after the vehicle component 4. The second valve 7 has an inlet arranged to receive the thermal fluid from the vehicle component 4, which thermal fluid has been used for cooling the vehicle component 4. The second valve 7 has an openable and closable first outlet 7a in fluid communication with the heater 6. In other words, the second valve 7 receives thermal fluid that has been used to cool the vehicle component 4 of the electric vehicle. The second valve 7 has an openable and closable second outlet arranged to circle thermal fluid back to the passive cooling system 25. The control unit 9 is arranged to direct excess heat from the vehicle component 4 to the heater 6 by controlling the opening and closing of the second valve 7. Preferably, the second valve 7 is of a type that makes it possible to control the opening and closing the first and second outlets independently of each other. Thus, it is possible to control the size of the portions of the flow passing through each of the outlets.

The thermal fluid is transported in a passage in the first cooling loop 14, the passage being for example piping. The thermal fluid in the first cooling loop 14 passes through the passive cooling system 25 and further to the vehicle component 4 for cooling the vehicle component. The fluid passes the vehicle component 4 and flows further to the inlet of the second valve 7. The fluid can then be passed to the heater 6 via the first outlet 7a or can be circled back to the passive cooling system 25 via the second outlet of the second valve 7. The thermal fluid passes on to the heater 6 if the first outlet 7a is open, otherwise the thermal fluid is passed back to the cooling system 25.

The second valve 7 can be any kind of valve of valve assembly with one inlet and two outlets. For example, the valve 7 is a three-way valve. The valve 7 is a valve that can be controlled via signals from a control unit, either via wire or wireless signals.

The thermal management system 1 comprises a control unit 9 for controlling components, such as valves and pumps, of the thermal management system 1.

The system 1 comprises a first temperature sensor 8 arranged in the first cooling loop 14 for measuring the temperature of the thermal fluid entering the inlet of the first valve. The temperature sensor 8 is arranged to measure the temperature of the thermal fluid that has been used for cooling the vehicle component 4, which thermal fluid is received by the second valve 7. The first temperature sensor 8 is, for example, arranged in the second valve 7 or in a passage, such as a pipe, before the thermal fluid enters the second valve 7.

In one aspect, the thermal management system 1 may comprise a third valve 11 which can be used to selectively pass the thermal fluid from the heater 6 to the cabin for heating the cabin, or to the heat exchanger 5 for heating the energy storage system, or to both. The third valve 11 has an inlet arranged to receive thermal fluid from the heater 6 and openable and closable first outlet connected to the cabin 2 and arranged to pass the thermal fluid from the heater 6 to the cabin 2 when it is opened. The third valve 11 has an openable and closable second outlet connected to the heat exchanger 5 and arranged to pass the thermal fluid from the heater 7 to the heat exchanger 5 when it is opened. The control unit 9 is configured to control the valve 11, and accordingly control whether the thermal fluid from the heater 7 is to be used to heat the cabin 2 and/or the energy storage system 3.

The vehicle comprises a second cooling loop for cooling the cabin 2. The second cooling loop directs the fluid from the passive cooling system 25 to the cabin, from the cabin through the cooling unit 10, and then back to the passive cooling system 25. The second cooling system may also be used to cool the energy storage system 3 via the heat exchanger 5.

The vehicle comprises a third cooling loop for cooling the energy storage system 3 when it needs cooling. The third cooling loop directs the fluid from the passive cooling system 25 to the energy storage system 3, through the energy storage system 3 and then back to the cooling system 25. The thermal management system may comprise a fourth valve 12 for directing the third thermal fluid to the heat exchanger 5. The fourth valve 12 comprises one inlet and a first and a second openable and closable outlets. The fourth valve 12 can be used to selectively pass the thermal fluid from the energy storage system 3 to the heat exchanger 5 via the first outlet, or back to the passive cooling system 25 via the second outlet. The third thermal fluid from the second outlet 1 of the fourth valve 12 can be both heated and cooled at the heat exchanger 5. When the third thermal fluid is to be cooled, it is cooled via the heat exchanger 5 by the second thermal fluid, and when third thermal fluid is heated, it is heated via the heat exchanger 5 by the thermal fluid from the heater 6. The control unit 9 is configured to control the fourth valve 12, and accordingly control whether the thermal fluid from the energy storage system 3 is to be passed to the heat exchanger 5 or to the passive cooling system 25.

The thermal management system 1 may further comprise a fifth valve 30 having an inlet connected to the first outlet 7a of the second valve 7 and an outlet connected to the passive cooling system 25. The control unit 9 can then be arranged to control the opening and closing of a fifth valve 30 so that it is opened when the first outlet 7a of the second valve 7 is opened, and closed when the first outlet 7a of the second valve 7 is closed, and to control the opening and closing of the second outlet so that it is opened when the first outlet 7a of the second valve 7 is closed and closed when the first outlet 7a of the second valve 7 is opened.

With this, it is possible to circulate the first thermal fluid in the first cooling loop 14 for cooling the vehicle component 4 when there is no excess heat in the thermal fluid, or if the cabin 2 or energy storage system 3 does not need any heat. The first thermal fluid is kept circulating in the first cooling loop 14 until any of the cabin 2 and energy storage system 3 needs heating and there is excess heat in the thermal fluid.

The illustrated example system uses a first temperature sensor 8 to determine if there is excess heat in thermal fluid that has been used to cool the vehicle component 4. With the term "excess heat in the thermal fluid that has been used to cool the vehicle component" the meaning is, if the heat energy in the thermal fluid is enough to contribute to the heating of the cabin and/or the energy storage system. If not, the thermal fluid can be circled back to the passive cooling system 25 via a second valve 7. If there is excessive heat, the thermal fluid can be passed on to the heater 6, via a second valve 7 so that the heater 6 can heat the thermal fluid less than without the heat from the thermal fluid from the vehicle component 4. Excessive heat from the vehicle component 4 can thus be used to heat the energy storage system 3 and/or a cabin 2 of the electric vehicle. In this example, the third valve 11 can be used to direct the heat to heat the cabin 2 or to the energy storage system 3 via a heat exchanger 5 or both. For the cabin, the heat is provided to a cooling and heating unit, e.g. a heating, ventilation, and air conditioning, HVAC unit, arranged in the cabin. The heat exchanger 5 is arranged to transfer thermal energy from a thermal fluid to another thermal fluid, or from one fluid to several fluids. The heat exchanger 5 is, for example, a chiller. A chiller is a plate-to-plate heat exchanger that transfers thermal energy from a thermal fluid to another thermal fluid, or from one fluid to several fluids.

The heater 6 and the cooling unit 10 are illustrated to have two power sources, an external power source 26 and the energy storage system 3. Of course, the external power source 26 can be unplugged when the electric vehicle is to be used. The external power source 26 may be the same external power source 26 that charges the energy storage system 3, or it may be an external power source 26 dedicated to the heater 6 and cooling unit 10. In other words, the external power source 26 may be powering the electric vehicle in standstill conditions, with or without charging the energy storage system.

The second passage via the passive cooling system 25 goes via the cooling unit 10 and the thermal fluid in this passage 14 is used to cool the cabin 2 and/or the energy storage system 3 via the heat exchanger 5.

The third passage 14 is used for cooling the energy storage system 3 and is selectively connected via the heat exchanger 5 at the fourth valve 12. The thermal fluid of the third passage 14 can be both heated and cooled at the heat exchanger 5.

The control unit 9 may be arranged to control the opening and closing of all valves in the illustrated example. The illustrated example may comprise pumps for pumping thermal fluid, additional temperature sensors, pressure sensors, and expansion valves which may also be controlled by the control unit 9.

Figure 4:
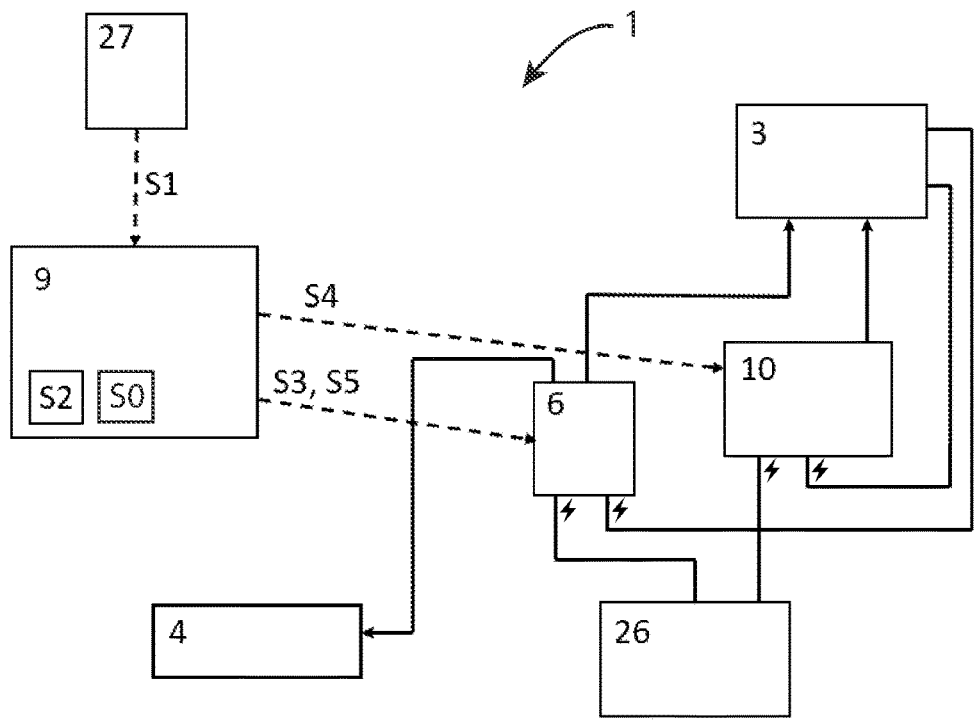
FIG. 4 shows a schematic diagram of an example thermal management system with added heating of a vehicle component.

FIG. 4 shows a schematic diagram of an example thermal management system 1 with added heating of a vehicle component 4. The control unit 9 is, for example, arranged to, when the heater 6 is powered by the external power source 26, control S5 the heater 6 to heat the vehicle component 4 when the measured temperature is below the minimum temperature 15. This is advantageous because with a pre-heated vehicle component 4, the heat from the vehicle component 4 can then be used to heat the energy storage system 3 or the cabin 2 of the electric vehicle when the external power source 26 is no longer plugged in. The vehicle component 4 is thus used as thermal storage.

Looking at the example of FIG. 3, the control unit 9 is arranged to heat thermal fluid at the heater 6 and the thermal fluid is then passed to the vehicle component 4 via third valve 11, the heat exchanger 5, first valve 13 and the passive cooling system 25. Thus, to control S5 the heater 6 to heat the vehicle component 4 when the measured temperature is below the minimum temperature 15 may also comprise to control third valve 11 and first valve 13 so that heated thermal fluid is passed to the vehicle component 4.

Figure 5:
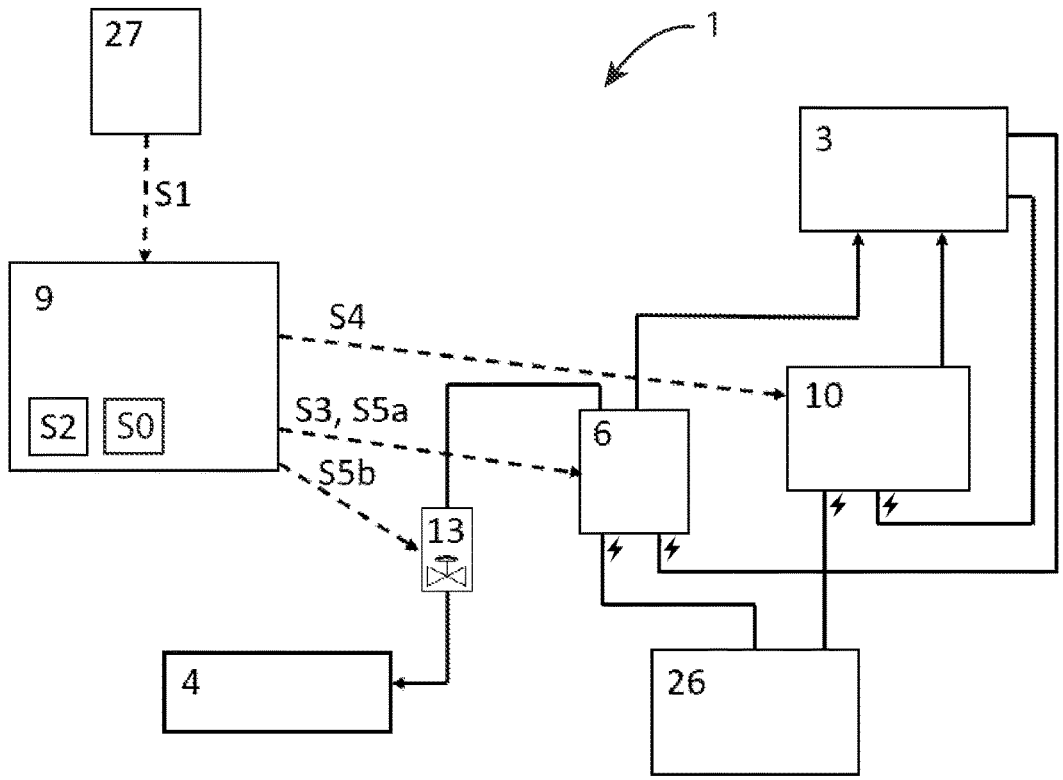
FIG. 5 shows a schematic diagram of an example thermal management system with added control of a first valve.

FIG. 5 shows a schematic diagram of an example thermal management system 1 with added control of a valve. To control S5 the heater 6 to heat the vehicle component 4 comprises, for example, to control S5a the amount of heat provided to a thermal fluid by the heater 6 and to control S5b the opening and closing of a first valve 13 to provide the heat to the vehicle component 4 via the thermal fluid. In other words, a thermal fluid is used for transporting the heat from the heater 6 to the vehicle component 4 via a first valve 13 and the first valve 13 is used to control the flow of the thermal fluid to the vehicle component 4. The thermal management system 1 thus comprises the first valve 13 and the first valve 13 is arranged between the heater 5 and the vehicle component. This is an efficient way to provide heat to the vehicle component 4. The first valve 13 can be closed when the vehicle component 4 is not to be heated or when the heat from the vehicle component 4 is not to be used to heat the energy storage system 3 or the cabin 2.

In the example of FIG. 3, both first valve 13 and second valve 7 are to be opened to allow thermal fluid to flow through the heater 6. Second valve 7 is a three-way valve with one output port to the heater 6 and one output port that can be opened when the thermal fluid should be kept in a closed loop with the vehicle component 4 and the passive cooling system 25, i.e. when the vehicle component 4 is not to be heated and when excessive heat from the vehicle component 4 is not to be used to heat the energy storage or the cabin 2.

Figure 6:
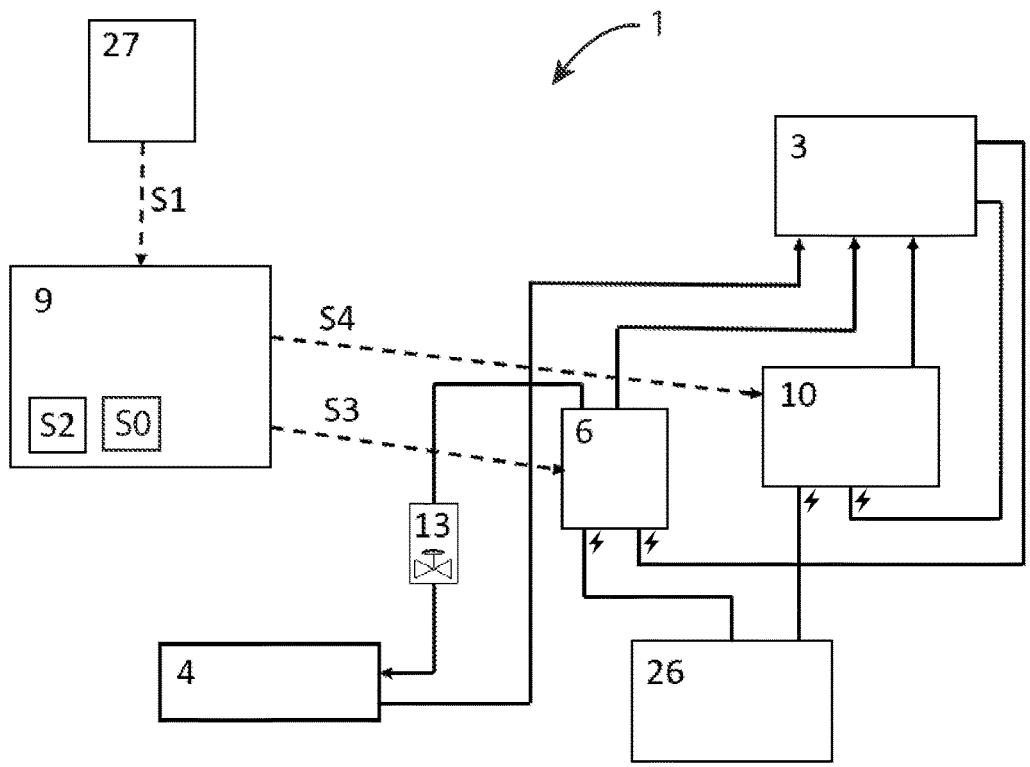
FIG. 6 shows a schematic diagram of an example thermal management system where heat from the vehicle component can be reused to heat the energy storage system.

FIG. 6 shows a schematic diagram of an example thermal management system 1 where heat from the vehicle component 4 can be reused to heat the energy storage system 3. The control unit 9 may thus be arranged to, when the heater 6 is powered by the energy storage system 3, direct excess heat from the vehicle component 4 to the energy storage system 3. The vehicle component 4 is thus used as thermal storage for heating the energy storage system 3 when needed.

Figure 7:
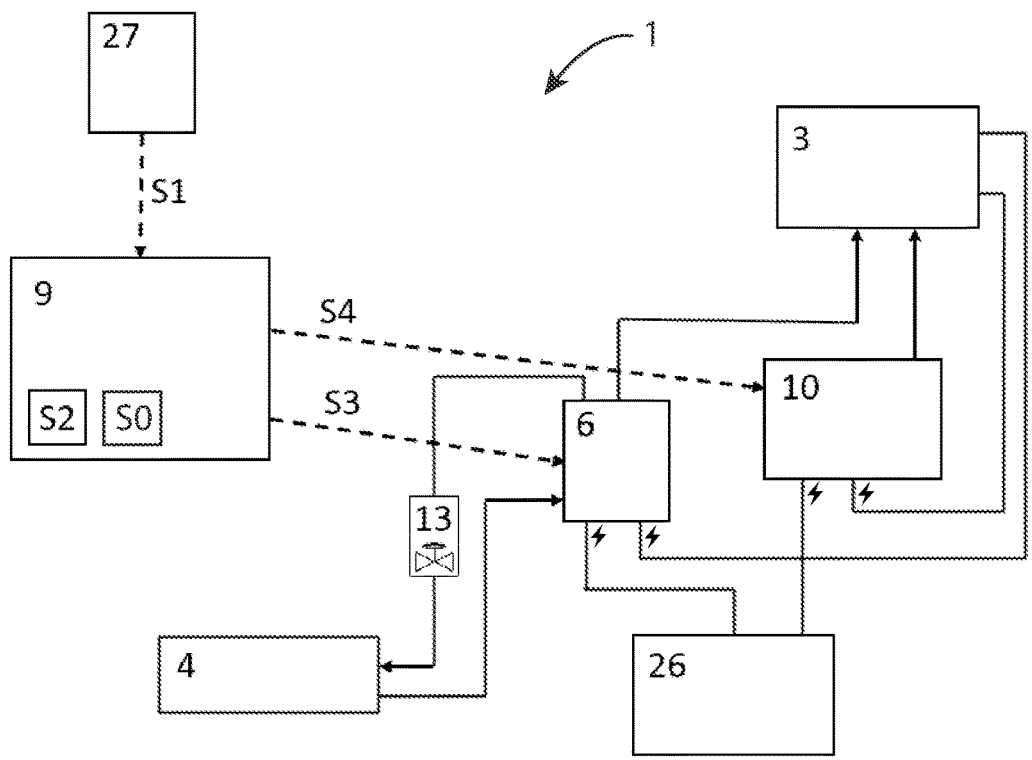
FIG. 7 shows a schematic diagram of an example thermal management system where heat from the vehicle component can be reused to heat the energy storage system via the heater.

FIG. 7 shows a schematic diagram of an example thermal management system 1 where heat from the vehicle component 4 can be reused to heat the energy storage system 3 via the heater 6. Thus, the excess heat from the vehicle component 4 may be directed to the energy storage system 3 via the heater 6. The heat is thus directed from the heater 6 to the energy storage system 3 in the same way as when heating the energy storage system 3 using only the heater 6. This is also the case in the example of FIG. 3. The heat is transported in thermal fluid in passages 14 for the thermal fluid. The thermal fluid with the heat from the vehicle component 4 can then be further heated at the heater 6 if the energy storage system 3 needs to be heated more than what can be achieved with the heat from the vehicle component 4.

Figure 8:
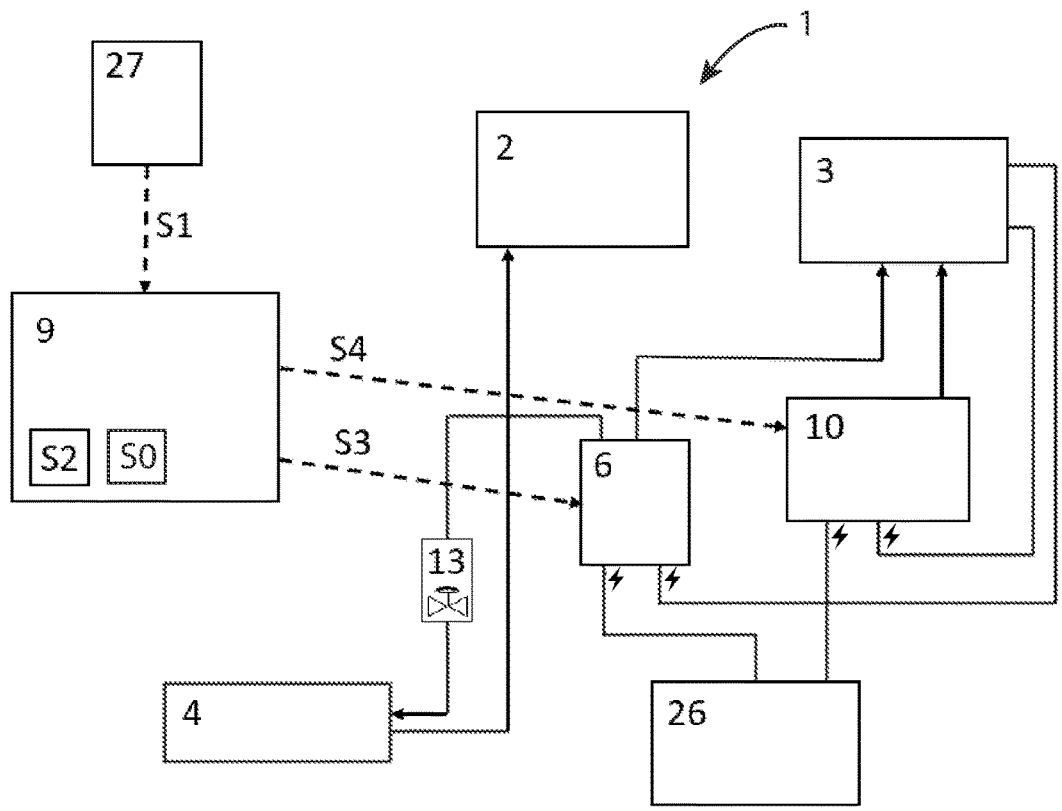
FIG. 8 shows a schematic diagram of an example thermal management system where heat from the vehicle component can be reused to heat a cabin.

FIG. 8 shows a schematic diagram of an example thermal management system 1 where heat from the vehicle component 4 can be reused to heat a cabin 2. The control unit 9 may thus be arranged to, when the heater 6 is powered by the energy storage system 3, direct excess heat from the vehicle component 4 to a cabin 2 of the electric vehicle. The thermal storage of the vehicle component 4 can thus also be used to heat the cabin 2 in addition to, or instead of, the energy storage system 3.

Figure 9:
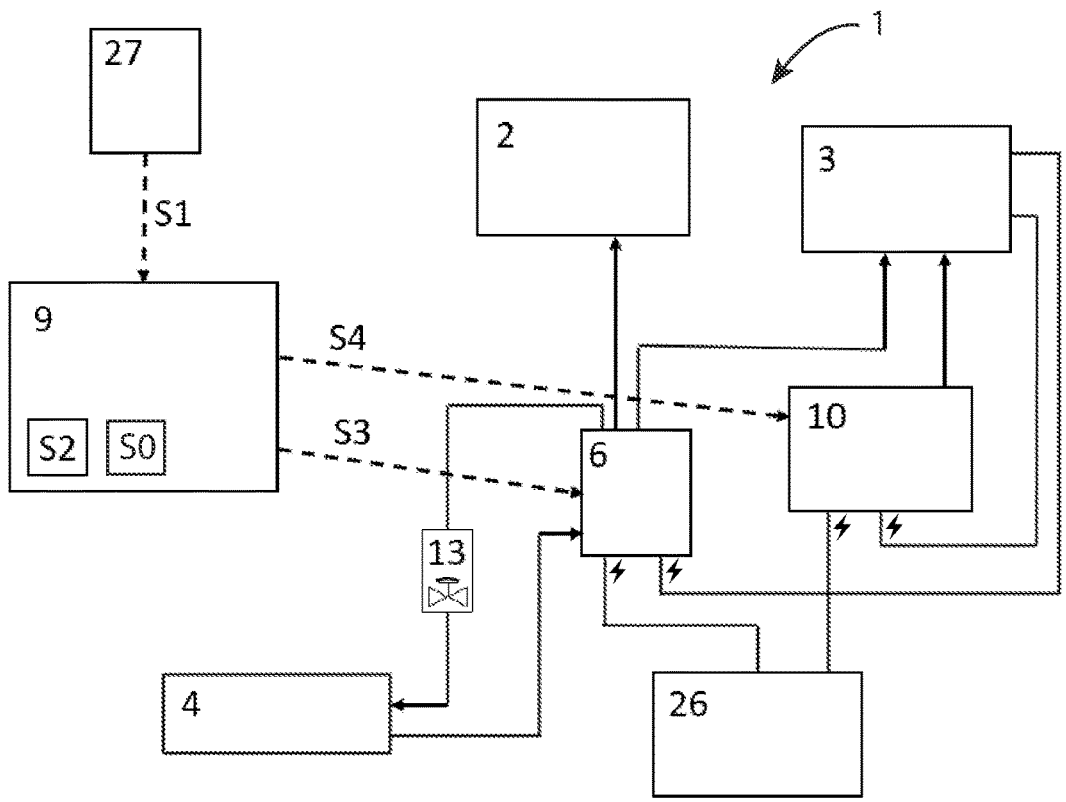
FIG. 9 shows a schematic diagram of an example thermal management system where heat from the vehicle component can be reused to heat the energy storage system and/or the cabin via the heater.

FIG. 9 shows a schematic diagram of an example thermal management system 1 where heat from the vehicle component 4 can be reused to heat the energy storage system 3 and/or the cabin 2 via the heater 6. According to some aspects, the excess heat from the vehicle component 4 is directed to the cabin 2 via the heater 6. Thus, the excess heat from the vehicle component 4 passes the heater 6 for the energy storage system 3 or the cabin 2 or both. The heater 6 can then further heat the energy storage system 3 or the cabin 2 if the excess heat is not enough to heat to a required level. A combination of heat from the vehicle component 4 and the heater 6 can thus be used to heat the energy storage system 3 and/or the cabin 2.

Figure 10:
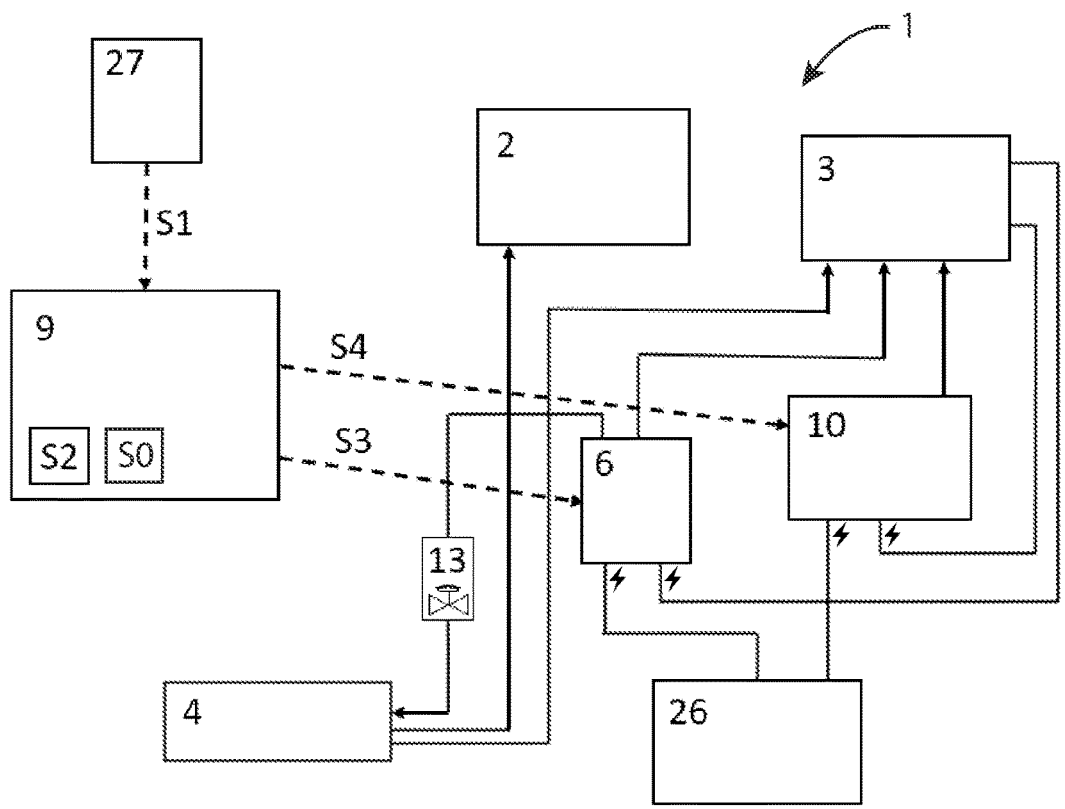
FIG. 10 shows a schematic diagram of an example thermal management system where heat from the vehicle component can be reused to heat the energy storage system and/or the cabin.

FIG. 10 shows a schematic diagram of an example thermal management system 1 where heat from the vehicle component 4 can be reused to heat the energy storage system 3 and/or the cabin 2. In this example, both the energy storage system 3 and the cabin 2 are heated with heat from the vehicle component 4. In this example, the heat does not pass the heater 6.

Figure 11:
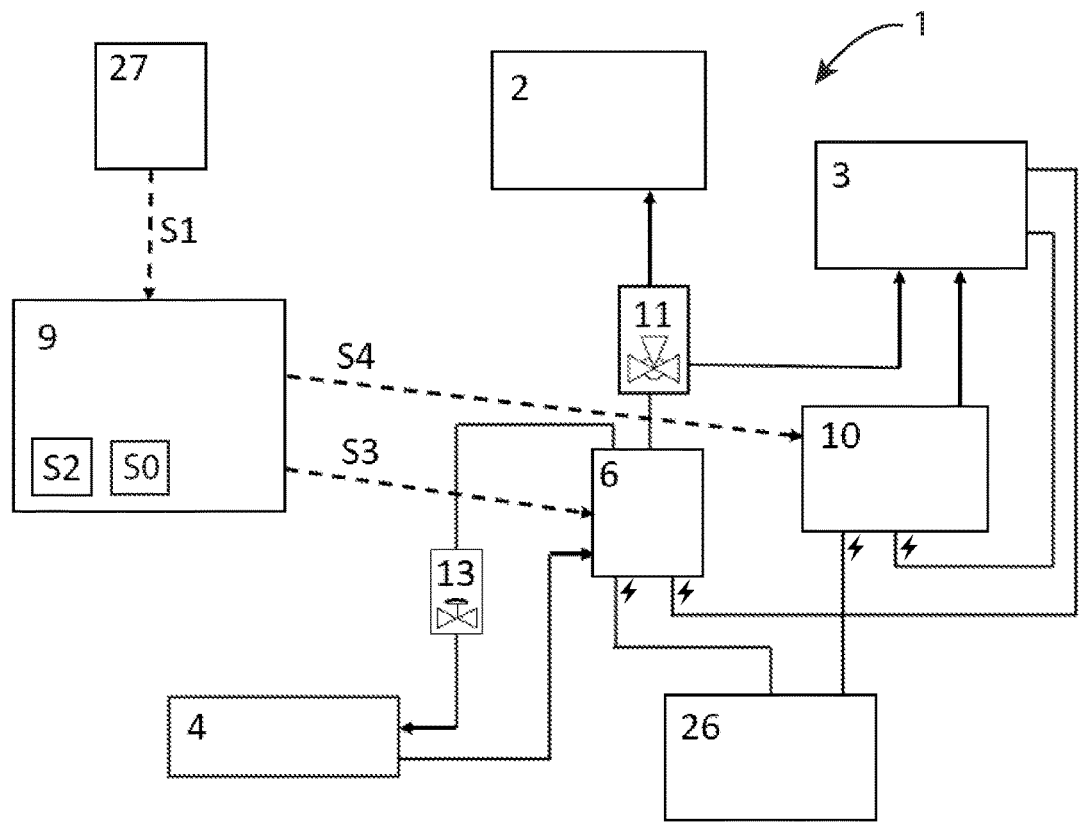
FIG. 11 shows a schematic diagram of an example thermal management system where heat from the vehicle component can be reused to heat the energy storage system and/or the cabin via the heater and via a three-way valve.

FIG. 11 shows a schematic diagram of an example thermal management system 1 where heat from the vehicle component 4 can be reused to heat the energy storage system 3 and/or the cabin 2 via the heater 6 and via a three-way third valve 11. In this example, both the energy storage system 3 and the cabin 2 can be heated with heat from the vehicle component 4. The control unit 9 may be arranged to control the opening and closing of the output ports of the three-way third valve 11 so that heat is directed to the energy storage system 3, to the cabin 2 or both. In this example, thermal management system 1 comprises the third valve 11 which is arranged between the heater 5 and the cabin 2 and the energy storage system 3.

It should be noted that, in FIGS. 7 to 11, first valve 13 is illustrated. However, in the illustrated examples, first valve 13 is optional.

As previously explained, thermal fluid may be used to pass heat between components. In such a case, the black lines in the figures represent passages 14 for thermal fluid.

The thermal fluid may be liquid or gas, depending on the components used to heat or cool. In general, passages that transport thermal fluid for cooling has refrigerant gas and passages for heating comprises a thermal liquid. But other solutions are possible. When the thermal fluid is a refrigerant gas, it is for example R134a or R1234YF or similar. It should be noted that different parts of the piping may hold different types of thermal fluid, such as a glycol coolant, water or a refrigerant gas.

The above thermal management system is to be arranged in an electric vehicle. The vehicle is, for example, of a short-distance type, such as bulldozers and excavators, which are carrying out work within a small area and not intended for long distance travels. The vehicle can also be of a long-distance type, such as a car, a bus, or a truck.

The invention claimed is:

1. A thermal management system for an electric vehicle which includes an energy storage system and a vehicle component that requires cooling, wherein the vehicle component is one of a drive train, e-motor, inverter, or DC/DC converter, wherein there is a preferred temperature range within which the energy storage system is to be operated, and the range is between a minimum temperature and a maximum temperature, the thermal management system comprising:
a heater arranged to heat the energy storage system, wherein the heater is arranged to be powered by either the energy storage system or an external power source,
a control unit arranged to control the heater and configured to identify when the heater is powered by the external power source, and to, when the heater is powered by the external power source:
receive data associated with the ambient temperature,
determine whether the ambient temperature is below or above the minimum temperature,
control the heater to heat, when the ambient temperature is below the minimum temperature, the vehicle component and the energy storage system, and
wherein the control unit is arranged to direct excess heat from the vehicle component to the energy storage system when the heater is powered by the energy storage system.

2. The thermal management system according to claim 1, wherein the electric vehicle comprises a cooling loop including a thermal fluid for cooling the vehicle component, the control unit is arranged to control the heater to heat the vehicle component by controlling the amount of heat provided to the thermal fluid by the heater and by controlling the opening and closing of a first valve to provide the heat to the vehicle component via the thermal fluid.

3. The thermal management system according to claim 1, wherein the electric vehicle comprises a cooling loop including a thermal fluid for cooling the vehicle component, the heater is arranged to heat the thermal fluid in the cooling loop when the heater is powered by the external power source and the ambient temperature is below the minimum temperature, and the control unit is arranged to direct the thermal fluid from the cooling loop to heat the energy storage system when the heater is powered by the energy storage system.

4. The thermal management system according to claim 1, wherein the excess heat from the vehicle component is directed to the energy storage system via the heater.

5. The thermal management system according to claim 4, wherein the electric vehicle comprises a cooling loop including a thermal fluid for cooling the vehicle component, the thermal management system includes a second valve disposed in the cooling loop, the second valve has an inlet arranged to receive the thermal fluid from the vehicle component, and an openable and closable outlet in fluid communication with the heater, and the control unit is arranged to direct excess heat from the vehicle component to the heater by controlling the opening and closing of the second valve.

6. The thermal management system according to claim 1, wherein the thermal management system comprises a heat exchanger arranged to heat the energy storage system, the heater is arranged to heat the heat exchanger when the energy storage system is colder than a minimum temperature, and the control unit is arranged to direct excess heat from the vehicle component to the heater when the heater is powered by the energy storage system.

7. The thermal management system according to claim 1, comprising a cooling unit arranged to cool the energy storage system, the cooling unit is arranged to be powered by either the energy storage system or an external power source, and the control unit is configured to control the cooling unit to cool the energy storage system to a predetermined temperature that is equal to or above the minimum temperature when the cooling unit is powered by the external power source and the ambient temperature is above the minimum temperature.

8. The thermal management system according to claim 1, wherein the control unit is arranged to, when the heater is powered by the energy storage system, direct excess heat from the vehicle component to a cabin of the electric vehicle.

9. The thermal management system according to claim 1, wherein the excess heat from the vehicle component is directed to the cabin via the heater.

10. The thermal management system according to claim 1, wherein the control unit is arranged to control the heater to heat, when the measured temperature is below the minimum temperature, the energy storage system up to a temperature which is at least 5° C. higher than the minimum temperature.

11. A method for thermal management of an electric vehicle which includes an energy storage system and a vehicle component that requires cooling, wherein the vehicle component is one of a drive train, e-motor, inverter, or DC/DC converter, wherein there is a preferred temperature range within which the energy storage system is to be operated, and the range is between a minimum temperature and a maximum temperature, wherein the vehicle comprises a heater arranged to heat the energy storage system, wherein the heater is arranged to be powered by either the energy storage system or an external power source, and the method comprises when the heater is powered by the external power source:
receiving data associated with the ambient temperature,
determine whether the ambient temperature is below or above the minimum temperature,
preheating the energy storage system when the ambient temperature is below the minimum temperature,
preheating the vehicle component when the ambient temperature is below the minimum temperature, and
wherein the method comprises directing excess heat from the vehicle component to the energy storage system when the heater is powered by the energy storage system.

12. The method according to claim 11, wherein the vehicle comprises a cooling unit arranged to cool the energy storage system, and the cooling unit is arranged to be powered by either the energy storage system or the external power source, and the method includes precooling the energy storage system to a predetermined temperature that is equal to or above the minimum temperature when the measured temperature is above the minimum temperature and the cooling unit is powered by the external power source.

13. An electric vehicle comprising:
   an energy storage system,
   a vehicle component that requires cooling, wherein the vehicle component is one of a drive train, e-motor, inverter, or DC/DC converter, and
   a thermal management system that includes:
      a heater arranged to heat the energy storage system, wherein the heater is arranged to be powered by either the energy storage system or an external power source,
      a control unit arranged to control the heater and configured to identify when the heater is powered by the external power source, and to, when the heater is powered by the external power source:
         receive data associated with the ambient temperature,
         determine whether the ambient temperature is below or above the minimum temperature,
         control the heater to heat, when the ambient temperature is below the minimum temperature, the vehicle component and the energy storage system, and
   wherein the control unit is arranged to direct excess heat from the vehicle component to the energy storage system when the heater is powered by the energy storage system.

* * * * *